United States Patent Office 3,148,173
Patented Sept. 8, 1964

3,148,173
POLYURETHANE-UREAS CONTAINING UREA-LINKED N-(2-HYDROXYPROPYL)ALKYLENE DIAMINES
Seymour L. Axelrood, Trenton, Mich., assignor to Wyandotte Chemicals Corporation, Wyandotte, Mich., a corporation of Michigan
No Drawing. Filed Jan. 26, 1959, Ser. No. 788,796
26 Claims. (Cl. 260—75)

The present invention relates to new and useful polyurethane-urea polymers and is more particularly concerned with polyurethane-urea polymers containing an N-(2-hydroxypropyl)alkylene diamine-urea-linked chain structure. More specifically, the present invention relates to polyurethane-urea polymers incorporating urea-linked N-(2-hydroxypropyl)alkylene diamines, which are prepared by the chain-extension of isocyanate-terminated polyurethanes, and to a method of producing said urea-linked N-(2-hydroxypropyl)alkylene diamine-modified polyurethanes.

The chemistry and technology of polyurethanes has made great strides since the early work of Otto Bayer reported in Angewandte Chemie A 59, 257 (Sept. 1947). Much of this later work has been summarized in the report of A. C. Beutel et al. entitled "Polyurethanes," published in 1956 by Polyurethane Associates, Cambridge, Massachusetts; in the B. A. Dombrow monograph entitled "Polyurethanes" published in 1957 by Reinhold Publishing Corporation, New York; and in the Kirk-Othmer "Encyclopedia of Chemical Technology," First Supplement Volume, under the heading "Urethane Polymers." Numerous patents issued in recent years also give evidence of tremendous activity in this art.

Among the noteworthy advances in this area may be mentioned the production of polyurethane-urea polymers of elastomeric or plastic nature by the chain-extension of isocyanate-terminated polyurethane polymers by reaction with water, thereby converting isocyanate groups to amine groups which then react with other isocyanate groups to form urea linkages. Diamines have also been reacted directly with isocyanate-terminated polyurethanes for purposes of chain extension through formation of urea linkages. The diamines produced by hydrolysis of isocyanates and likewise added as such to isocyanate-terminated polyurethanes have notably been primary diamines, such as tolylene diamine, an arylene diamine, and the like. Alkylene and cycloalkylene diamines have also been proposed as chain extenders of polyurethane polymers for purposes of producing elastomeric or plastic products.

These prior art polyurethane-urea polymers produced by chain extension using primary diamines are generally characterized by difficulty of processing on conventional rubber equipment, difficulty of processing to obtain useful values of tensile strength through vulcanization unless unsaturation has been built into the molecule, and are frequently highly colored. At utilizable tensile strength values, such products have been extremely difficult to process, due to the accompanying high degree of hardness. It is understandable that efforts have been made to solve this problem by introducing unsaturation into the molecule, to enable the processing of softer lower-tensile strength polymers which may subsequently be hardened prior to molding by vulcanization or by release of vulcanization agents in situ during the molding or casting process.

It has also been proposed to chain-extend polyurethane polymers by the use of diols, such as triethylene glycol, butanediol, or butynediol. However, the resulting straight polyurethane polymers from only a few of these diols have exhibited properties comparable to those obtained using the water or diamine type of chain-extension and cross-linking. Similarly, certain primary aminoalcohols have been proposed for the purpose of chain extension, this practice giving rise to the formation of a urea linkage with a reactive hydroxyl group attached to the N atom, which primary hydroxyl then undergoes urethane formation with available NCO groups. In such polymers, it will be noted, linkages of the following type recur:

—NH—CO—HN—CH$_2$CH$_2$—O—CO—NH— so that the reactive hydroxy group becomes a part of the linear polymer chain, in which two N atoms are furnished by the isocyanate-terminated polyurethane and one by the aminoalcohol. In this linkage, two active urea hydrogen atoms are present for biuret formation or hydrogen bonding and one active urethane hydrogen atom for allophanate formation or hydrogen bonding.

It has likewise been proposed to incorporate diamines, glycols, or primary aminoalcohols such as ethanolamine, into polyesters which are then reacted with polyisocyanates. The polyester resin in such case is actually a polyesteramide, and polyurethane rubbers produced in such manner are characterized by a uniformly poor relative tear strength.

In addition, it is to be observed that primary alcohol substituted diamines such as aminoethylethanolamine have been employed in making polyurethanes by the reaction therewith of glycol bischloroformates, thus giving rise to polymeric products having recurring linkages to the following type:

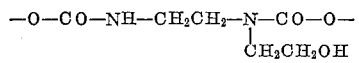

wherein it will be noted the linkages are strictly urethane in nature, all of the N atoms (2) being furnished by the diamine. Moreover, in this recurring unit, only one active hydrogen is present, besides the reactive primary hydroxy group, for allophanate cross-linking or hydrogen bonding. Upon reaction of this type of product with isocyanate, cross linking occurs, but the polymer is nonetheless a simple polyurethane. No urea nitrogens suitable for biuret formation or hydrogen bonding, of particular importance from the standpoint of obtaining satisfactory elastomeric characteristics, are present.

So far as I am aware, N-(hydroxyalkyl)alkylene diamines have never been employed or suggested as chain extenders for isocyanate-terminated polyurethane polymers, nor has it been suggested to incorporate any specific urea-linked N-(hydroxyalkyl)alkylene diamine into such polyurethane-urea molecules, or that any advantage would be realized from so doing.

It has now been found that specific N-(secondary-hydroxyalkyl)alkylene diamines, viz., N-(2-hydroxypropyl)-alkylene diamine compounds of the formula

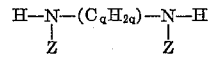

wherein $q$ is an integer from 2 to 10, inclusive, and wherein Z is selected from hydrogen and

—CH$_2$CHOHCH$_3$ at least one Z being —CH$_2$CHOHCH$_3$, may be incorporated into polyurethane-urea polymers by the reaction thereof with isocyanate-terminated polyurethane polymers to give new and valuable polyurethane-urea polymers characterized by urea-linked N-(2-hydroxypropyl)alkylene diamine intermediate and terminal chain structure.

Representative compounds within the scope of the above formula which may be employed are, for example, N-(2-hydroxypropyl)ethylene diamine,
N,N'-di(2-hydroxypropyl)ethylene diamine,
N-(2-hydroxypropyl)propylene diamine,
N,N'-di(2-hydroxypropyl)propylene diamine,
N-(2-hydroxypropyl)butylene diamine,
N-(2-hydroxypropyl)hexylene diamine,
N-(2-hydroxypropyl)octamethylene diamine,
N-(2-hydroxypropyl)decamethylene diamine,
N-(2-hydroxypropyl)isobutylene diamine, and the like, with N-(2-hydroxypropyl)ethylene diamine being preferred. Thsee compounds are formed by the addition of one or two moles of propylene oxide to the selected alkylene diamine according to known procedure.

In contrast to the foregoing representations of the more or less successful attempts of the prior art to obtain a solution to some of the aforementioned problems, the recurring linkages formed in accord with the present invention are of the general formula:

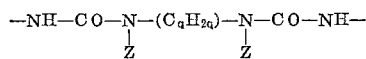

wherein Z is selected from $—CH_2CHOHCH_3$ and hydrogen, at least one Z being $—CH_2CHOHCH_3$, and wherein $q$ is an integer from 2 to 10, inclusive. These, it will be noted, contain in each case four active centers for cross linking, two or three active urea hydrogen atoms for biuret formation or hydrogen bonding, and one or two secondary hydroxyl groups for further polyurethane cross-linking or hydrogen bonding. The importance of biuret-allophanate or hydrogen bonds in the preparation of elastomers is readily recognized and the pendant secondary hydroxyl-containing propyl groups are likewise of importance in this regard, as will become more fully apparent hereinafter.

These recurring linkages, to attain desirable properties, should occur at least once for every 8000 molecular weight units of polyurethane-urea product. There may be more than one of these linkages for every 8000 molecular weight units of polyurethane-urea polymer but, on the average, it is preferred to have not more than one of these linkages for every 700 molecular weight units of product.

In its simplest form, such an exemplary polyurethane-urea polymer molecule radical may be represented as follows:

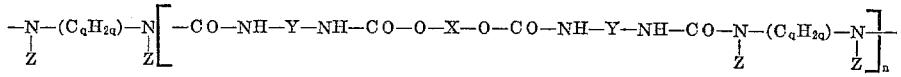

wherein Z is selected from hydrogen and

at least one of two adjacent Z's being $—CH_2CHOHCH_3$, wherein $q$ is an integer from 2 to 10, inclusive, wherein $n$ is an integer, preferably a large whole number, wherein $—O—X—O—$ is the radical obtained by removing the terminal hydrogen atoms of a polymeric glycol and Y is the organic radical of the polyisocyanate employed in producing the polyurethane.

The urea-linked N-(2-hydroxypropyl)alkylene diamine modified polyurethanes of the present invention have been found to exhibit advantageous properties, especially in the elastomer area, together with a desirable light-color. They have an improved ratio of the tensile strength to hardness, which enables them to be more readily processed in a comparatively softer state. In contrast to polyurethane polymers extended with diols and primary diamines, the N-(2-hydroxypropyl)alkylene diamine modified polyurethane-ureas of the invention exhibit superior tensile strength with contrasting softness and processability. In addition, because of their improved tensile strength to hardness ratio, and because of their pendant secondary hydroxyl groups, they may be vulcanized or cross-linked with convenience and facility, and at comparatively lower temperatures, by further reaction with organic polyisocyanates to give polyurethane-urea elastomers and plastics with greatly increased tensile strength. Due to the pendant secondary hydroxyl groups, the reaction rate of which with isocyanates is only about one-third of the reaction rate of isocyanates with primary hydroxyl groups, these polyurethane-ureas are readily adaptable to two stage processing, e.g., formation of the stable polyurethane-urea with pendant secondary hydroxyl groups and subsequent vulcanization by reaction of these relatively unreactive hydroxyl groups with polyisocyanates either directly or generated in situ to produce the further cross linked or vulcanized product. The product of Example 3, for instance, exhibits excellent properties for a vulcanized polyurethane-urea elastomer and the product of Example 1 is representative of a utilizable polyurethane-urea plastic in accord with the present invention.

It is accordingly an object of the present invention to provide new and useful polyurethane-urea polymers incorporating urea-linked N - (2 - hydroxypropyl)alkylene diamines and a method of producing same. It is a further object of the invention to provide new and useful elastomeric to plastic urea-linked N-(2-hydroxypropyl)-alkylene diamine modified polyurethane-ureas. Still a further object of the invention is to provide such novel urea-linked N-(2-hydroxypropyl)alkylene diamine modified polyurethane-ureas having in general a lighter color. An additional object is the provision of such urea-linked N-(2-hydroxypropyl)alkylene diamine modified polyurethane-ureas which are comparatively softer and therefore more readily processable at relatively high values of tensile strength. Still a further object is the provision of such-type polyurethane-ureas which are stable and are processable at relatively high values of tensile strength and which may readily be vulcanized or cross-linked with organic polyisocyanates to increase their tensile strength many fold. Other objects of the invention will become apparent hereinafter.

In brief, the urea-linked N-(2-hydroxypropyl)alkylene diamine-containing polyurethane-urea polymers of the present invention are prepared by reacting the selected N-(2-hydroxypropyl)alkylene diamine compound (II) with the selected isocyanate-terminated polyurethane polymer (I) according to either solvent, bulk, or emulsion technique, as more fully set forth hereinafter. The polyurethane prepolymer (I) is preparable from a large number of polymeric glycols $(a)$ and polyisocyanates $(b)$, also as more fully set forth hereinafter. The emulsion technique of chain extension is preferred from the point of more uniform homogeneity of reaction product.

POLYURETHANE PREPOLYMER—STARTING MATERIALS

The isocyanate-terminated polyurethane prepolymers (I) employed as starting materials according to the present invention may be any such type compound having a molecular weight in excess of about 500 which may be obtained by the reaction of a selected polymeric glycol $(a)$, having an average molecular weight of at least 250, with a stoichiometric excess of an organic polyisocyanate $(b)$. Such prepolymers are capable of a molecular weight increase through chain-extension with the particular chain-extension agents of the present invention.

The polyurethane polymers which may be extended according to this invention include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and $n$ is an integer sufficiently large that the molecular weight of the compound is at least 250, i.e., large enough that the polyoxyalkylene group —$(RO)_n$— has a formula weight of at least 232. Not all of the alkylene radicals present need to be the same. Glycols containing a mixture of radicals, as in the compound $HO(CH_2OC_2H_4O)_nH$, or $HO(C_2H_4O)_n(C_3H_6O)_m(C_2H_4O)_nH$, wherein $n$ and $m$ are together sufficient for attainment of the desired molecular weight, can be used. These glycols are either viscous liquids or waxy solids. To be of value in preparing polymers according to this invention, the molecular weight of the glycol should be at least 250 and may be as high as 10,000. It is preferably between 400 and 4000. Polytetramethylene ether glycols, also known as polybutylene ether glycols, may be employed. Polyethylene ether polypropylene ether glycols, having the above-indicated formula, are among the preferred glycols. Polyethylene ether glycols, poly-1,2-propylene ether glycols, polydecamethylene ether glycols, and poly-1,2-dimethylethyl ether glycols are representative of other operative compounds.

The preferred polymeric glycols (a) are polyoxyalkylene glycols, e.g., polyoxypropylene or polyoxybutylene glycols, of molecular weights between about 400 and 4000, preferably 400 to 2500 for the polyoxypropylene glycols and 750 to 4000 for the polyoxybutylene glycols, as well as the polyoxyethylenepolyoxypropylene glycols of molecular weight between about 1000 and 5000, preferably 1000 to 2000. Characteristics of representative preferred polyalkylene or polyalkylene ether glycols, including hydroxy numbers and molecular weights, are found in Table A.

*Table A.—Typical Properties of Representative Preferred Polyalkyleneether Glycols*

| Glycol | Percent polyoxyethylene | M. wt. of polyoxypropylene base | Hydroxyl number | Molecular wt. |
| --- | --- | --- | --- | --- |
| Polyoxyethylene-polyoxypropylene glycols: | | | | |
| L31 | 15 | 940 | 102.3 | 1,065 |
| L61 | 15 | 1,750 | 56.1 | 2,000 |
| L81 | 15 | 2,250 | 41.7 | 2,690 |
| P75 | 50 | 2,050 | 27.3 | 4,120 |
| F77 | 70 | 2,050 | 16.6 | 6,760 |
| F88 | 80 | 2,250 | 11.2 | 10,000 |
| Polypropylene glycols: | | | | |
| PPG 400 | 0 | | 261.5 | 429 |
| PPG 765 | 0 | | 145.0 | 765 |
| PPG 1000 | 0 | | 112.0 | 1,000 |
| PPG 2000 | 0 | | 56.4 | 1,995 |

Any of a wide variety of organic polyisocyanates (b) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate (usually about 80/20), 4,4-methylene-bis(phenylisocyanate), and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4'-methylene-bis(cyclohexylisocyanate) are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Additional polyisocyanates which may be employed, for example, include: p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with a,a'-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylene radicals. Elastomers made using polyalkylenearylene or polyalkylene-cycloalkylene ether glycols have improved freeze resistance as compared with the corresponding elastomers containing no cyclic radicals.

Another class of glycols useful in making polyurethanes extensible according to this invention are the polyalkylene ether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the glycol has a molecular weight of at least 250. These products may be made by condensing together glycols and thioglycols in the presence of a catalyst such as p-toluenesulfonic acid. As will be noted, these compounds resemble the polyalkylene ether glycols except that some of the alkylene radicals are joined by sulfur rather than oxygen. In each case, however, the compounds have terminal hydroxy groups which take part in the reaction with the organic polyisocyanate.

Also included in the polyurethane products which may be extended according to this invention are those made from a high molecular weight, substantially linear polyester and an organic diisocyanate of the type previously described. Products of this sort are described in the aforementioned Bayer article in Angewandte Chemie, and in U.S. Patents 2,621,166, 2,625,531 and 2,625,532. The polyesters should have molecular weights of at least 750 and are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, 1,6-hexylene glycol, and decamethylene glycol, and dicarboxylic acids such as malonic, maleic, succinic, adipic, pimelic, sebacic, oxalic, phthalic, terephthalic hexahydroterephthalic, and para-phenylene-diacetic acids, decamethylene dicarboxylicacid, and the like. Another useful group of compounds for this purpose are the polyester amide resins having terminal hydroxy groups. The preferred polyesters may be represented by the formula $HO-B-OOC-B'-COO_nBOH$ in which B and B' are hydrocarbon radicals derived from the glycol and dicarboxylic acid respectively and $n$ is an integer large enough so that the molecular weight of the compound as a whole is at least 750 and that the polyester group —[B—OOC—B'—COO]$_n$BO— has a molecular formula weight of at least 732. Preferably such polyesters have a molecular weight in excess of 1000. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol, such as a polyalkylene ether glycol, with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Patent 2,861,981, namely, those prepared from a polyisocyanate and the reaction product of an ester of an organic carboxylic acid with an excess of a saturated aliphatic glycol having only carbon atoms in its chain and a total of eight to fourteen carbon atoms, at least one two-carbon-atom branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula

—NH—CO—O—X—O—CO—NH— wherein the bivalent radical —O—X—O— is obtained by removing the terminal hydrogen atoms of a polymeric glycol, said glycol having a molecular weight of at least 250 and being selected from the group consisting of polyalkyleneether glycols, polyurethane glycols, polyalkylenearyleneether glycols, polyalkylene-cycloalkyleneether glycols, polyalkyleneether-polythioether glycols, polyesteramide glycols and polyester glycols of the formula HO—[B—O—CO—B'—CO—O]$_n$—B—OH wherein B and B' are hydrocarbon radicals and $n$ is an integer, and that a typical isocyanate-terminated polyurethane polymer produced from diisocyanates and dihydric glycols will on an average contain, at a 2:1 NCO:OH ratio, a plurality of intralinear molecules conforming to the formula

OCN—Y—NH—CO—O—X—O—CO—NH—Y—NCO wherein —O—X—O— has the value given previously and Y is the polyisocyanate hydrocarbon radical.

POLYURETHANE PREPOLYMER—PREPARATION

In the preparation of the starting polyurethane polymer (I), an excess of the organic polyisocyanate ($b$) over the polymeric glycol ($a$) is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the glycol will be at least one to one, and may be up to a 3 to 1 equivalent ratio. The glycol and the isocyanate are ordinarily reacted by heating with agitation at a temperature of 50° to 130° centigrade, preferably 70–120° centigrade. The ratio of organic polyisocyanate compound ($b$) to polymeric glycol ($a$) is usually and preferably between about 1.3:1 and 2.0:1.

The reaction is preferably, but not necessarily, effected in the absence of a solvent, when the prepolymer (I) is a fluid at processing temperatures. When it is not, or when it is desired to employ a solvent, convenient solvents are inert organic solvents having a boiling range above about 90° centigrade when the reaction is to be carried out in open equipment. Lower boiling solvents may of course be used where the reaction is carried out in closed equipment to prevent boiling off the solvent at the temperatures of the reaction. Solvents boiling at substantially more than 140° centigrade are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended elastomer is insoluble. Ketones, tertiary alcohols and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution, if an emulsion technique is to be employed in the chain extension; sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined.

Usual pHs are employed during preparation of the prepolymer, the reaction preferably being maintained substantially neutral. Bases accelerate the reaction, acids retard the reaction, and preferably neither are added.

CHAIN EXTENSION—PROCEDURE

In the solvent chain-extension process, the chain-extending agent is added to the isocyanate-terminated polyurethane prepolymer reaction medium and mixing continued, with or without further application of heat. During this period the molecular weight of the polyurethane reaction product increases and the mass forms a gel or, in some cases, rubbery chunks. It is then removed from the mixer and molded into sheets, for example; it may be sheeted out on a rubber mill. In some cases, a solution can be formed which may be cast into a film or used for coatings or adhesives.

In producing elastomeric polyurethane-urea latices of the present invention by the emulsion chain extension technique, the equivalent ratio of the organic polyisocyanate ($b$) and the polymeric glycol ($a$) is in most cases preferably maintained at from about 1.3:1 to 2.0:1. When using these equivalent ratios an initial polyurethane reaction product (I) is obtained which is usually a liquid under processing conditions, which, as illustrated by the examples hereinafter given, can be emulsified directly in an aqueous bath or can first be diluted with inert organic solvents, such as previously mentioned, and then emulsified in an aqueous bath. Where polyalkylene ether glycols are used in this process, molar ratios of organic diisocyanate to polyalkylene ether glycol higher than about 3:1 usually yield final polyurethane-urea polymers or mixtures of polymers which are more plastic than elastomeric. Similarly, polyalkylene ether glycols of lower molecular weight, or use of polyisocyanates having more than two NCO groups, also tend to yield polyurethane-urea polymers of a more plastic character.

The amount of N-(2-hydroxypropyl)alkylene diamine compound (II) used in the chain extension step is such that from 0.5 to 1.5 amine equivalents of (II) are present in the chain extension reaction for each equivalent of the isocyanate-terminated polyurethane starting polymer (I), preferably about 1.0 amine equivalent of (II) for each isocyanate equivalent of (I). The higher ranges ensure mainly terminal N-(2-hydroxypropyl)alkylene diamine groups through provision of enough of reactant (II) to react with all of the isocyanate radicals present although for solvent technique the higher ranges are not ordinarily recommended. For a diisocyanate-dihydric polyalkylene glycol or similar polyurethane, the ratio will usually be one mole of N-(2-hydroxypropyl)alkylene diamine compound (II) for each mole of isocyanate-terminated polyurethane.

According to the emulsion technique, elastomeric polyurethane-urea latices are produced by reacting the polymeric glycol compound (a) with a stoichiometric excess of an organic diisocyanate (b) and, while the reaction product (I) is in the form of a syrupy liquid, emulsifying it in water or an aqueous solution of the water-soluble or partially water-soluble chain extending agents of the present invention, preferably with vigorous agitation in the presence of an emulsifying agent. Where the initial reaction product (I) is too thick or viscous to emulsify properly in water, it can be diluted with an inert solvent and the resulting solution emulsified in the aqueous bath. If the chain-extending agent is water-insoluble, it can be added in the form of a solvent solution thereof. The emulsifying agent may be added either to the initial reaction product or to the aqueous medium in which the reaction product is to be emulsified, or may be formed in situ during addition of the reaction product to the said medium.

The N-(2-hydroxypropyl)alkylene diamine chain-extending agents of this invention (II), which are water-soluble, may be used in the form of solutions in producing these emulsions or latices since they react more readily with the isocyanate-terminated polyurethane (I) than does water itself. For the same reason, the prepolymer (I) may be emulsified in water just prior to adding the chain-extending agent. One hydrogen on each of the amine radicals reacts preferentially with the free isocyanate groups remaining in the initial polyurethane reaction product much more readily than does the hydrogen of the water, and therefore the chain is extended by reaction with the N-(2-hydroxypropyl)alkylene diamine even though the reaction takes place in an aqueous medium. The amount of N-(2-hydroxypropyl)alkylene diamine ordinarily employed will be that equivalent to the unreacted isocyanate groups remaining in the initial polyurethane reaction product, any excess being removed by washing with water. (The maximum degree of chain extension is theoretically obtained when there are present stoichiometric proportions of the diisocyanate-terminated polymer and the chain-extending agent, employing for such calculation the isocyanate equivalent weight of the initial polyurethane reaction product and the amine equivalent weight of the chain-extending agent.) It will be obvious, however, that somewhat lesser amounts may be employed, for the chain extension of the isocyanate-terminated polyurethane can be allowed to be completed with the water in which the N-(2-hydroxypropyl)alkylene diamine is dissolved. In emulsion polymerization, excess diamine may be used without much effecting molecular weight, since the diamine enters the dispersion of the polymer gradually, reacting to give maximum chain length; then the excess diamine is washed out. However, the products of emulsion chain extension and solvent chain extension are chemically identical as determined by their infrared absorption spectra.

The amount of water to be employed in the formation of the emulsion is not critical, although in general the minimum amount will be equal in volume to the initial polyurethane reaction product or the solvent solution or slurry of this product. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids or salts thereof; and alkali metal salts of high molecular weight organic acids. Nonionic agents such as polyoxyethylenepolyoxypropylene glycols, are preferred. The pH can then regulated to a neutral value, preferably not above 7, to minimize any tendency toward hydrolysis. Salts of the high molecular weight organic acids may be used as emulsifying agents. One method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From 2% to 6% of the emulsifying agent based on the weight of the prepolymer employed will usually be found sufficient to produce stable emulsions. When a fatty acid soap is used as the emulsifying agent, the soap must not be destroyed by acidic substances. The pH must therefore be maintained at least as high as that of an aqueous solution of the soap if stable latices are to be produced. For most fatty acid soaps the pH should be at least 9 and for this reason soaps are not preferred. It should be noted that the small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

The chain extension step, while a relatively fast reaction when employing the N-(2-hydroxypropyl)alkylene diamine chain extenders of the invention, may frequently be assisted by agitation of the emulsion for some time after its initial formation. This is usually accomplished by means of a conventional paddle type agitator at 30–90 r.p.m., or other conventional stirring equipment such as a Cowless Dissolver, which aids in contacting the emulsion droplets with the chain extender.

The polymer may be coagulated from its aqueous dispersion or latex by methods normally employed in the coagulation of rubber or synthetic elastomers from their latices. Common methods for effecting this coagulation are by the addition of acid, for example, acetic acid, or inorganic salts such as sodium chloride or calcium chloride. Mere acidification is sometimes not sufficient to coagulate the more stable latices. The addition of salt in addition to acid is often desirable. Usually from twenty to thirty parts of sodium chloride per 100 parts of water in the latex will effect coagulation. When the elastomer is to be precipitated from the latex, smaller amounts or none of the dispersing agent may be used, giving an intentionally less stable latex. In these cases the latex "creams," that is, a layer of the polymer collects which may be removed as a coagulum from the top or bottom of the water layer. The latex is preferably coagulated by freezing.

The coagulated polymer when removed from the water may be dried on a heated rubber mill or other milling equipment.

The following examples are given to illustrate the invention, but are not to be construed as limiting.

EXAMPLE 1.—POLYOXYPROPYLENE GLYCOL (a) *Prepolymer formation.*—4800 parts of polyoxypropylene glycol of molecular weight averaging 400 was added to 3200 parts of mixed isomers of tolylene diisocyanate (80/20;2,4/2,6). The NCO/OH mole ratio was 1.60. The mixture was heated at 100° centigrade for three hours. This polyurethane prepolymer when cooled to room temperature was too viscous to flow. The free isocyanate content was 6.15%.

(b) *Chain extension.*—Twenty parts of toluene and 35 parts of cyclohexanone were dissolved in 100 parts of this isocyanate-terminated prepolymer and the solution was emulsified in a solution of 6.6 parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 110 parts of water. Stirring at 15,000 r.p.m. was employed in this operation. After one minute a solution of 7.6 parts of N-(2-hydroxypropyl)ethylene diamine in 25 parts of water was added with stirring. A stable emulsion resulted. On freezing and then thawing this emulsion, coagulation took place and a polyurethane-urea polymer separated. This polymer was washed, dried, and molded into sheets at 300° F. Some characteristics of this polymer are shown in Table 1.

EXAMPLE 2.—POLYOXYETHYLENEPOLYOXYPROPYLENE GLYCOL (a) *Prepolymer formation.*—9302 parts of dihydric polyoxyethylenepolyoxypropylenes having a molecular weight of about 2,000, a polyoxyethylene content of about 15% by weight, and a molecular weight of the polyoxypropylene base of about 1,750, was mixed with 1499 parts of tolylene diisocyanate mixed isomers (80/20;2,4/2,6). The NCO/OH mole ratio was 2.0. The mixture was heated at 120° centigrade for three hours. At the end of this time the product had a viscosity of 5,100 centipoises at 25° centigrade and a free isocyanate content of 3.11%.

(b) *Chain extension.*—Forty parts of toluene were dissolved in 100 parts of this isocyanate-terminated prepolymer and this solution was emulsified with a solution of six parts of surface active agent, consisting of dihydric polyoxyethylenepolyoxypropylenes, having a molecular weight of about 10,000, a polyoxyethylene content of about 80% by weight, and a molecular weight of the polyoxypropylene base of about 2,250, in 100 parts of water. To this emulsion was added with stirring a solution of 4.4 parts of N-(2-hydroxypropyl)ethylene diamine in 25.6 parts of water. A stable suspension resulted which was coagulated by freezing and then thawing. The polymer was filtered off, washed, dried, and molded into sheets. The characteristics of this polymer are shown in Table 1.

EXAMPLE 3.—VULCANIZATION OR CROSS-LINKING

Some of the N-(2-hydroxypropyl)ethylene diamine extended polyurethane-urea polymer from Example 2 was mixed with 33 parts of an easy-processing-channel carbon black and three parts of 3,3'-dimethyl-diphenyl-methane-4,4'-diisocyanate per 100 parts of polymer. The mixture was heated for one hour at 121° centigrade to vulcanize it. The product had a tensile strength of 3770 p.s.i. with an elongation at break of 1180%. The stress at 300% elongation was 1010 p.s.i. Vulcanization was effected at a lower temperature than would have been necessary if hydroxyl groups had been absent from the polymer.

EXAMPLE 4.—COMPARATIVE EXAMPLE

A product produced according to Example 2 but chain-extended with 4.3 parts of tolylene diamine instead of N-(2-hydroxypropyl)ethylene diamine was also vulcanized in the same formulation as used in Example 3, but at 150° centigrade. A tensile strength of 2845 p.s.i. was obtained.

EXAMPLE 5.—POLYESTER (a) *Prepolymer formation.*—A polyester was made following the formulation and procedure given by N. Seeger in U.S. Patent 2,760,953 assigned to the Goodyear Tire & Rubber Co.

|  | Parts |
| --- | --- |
| Adipic acid | 2630 |
| Ethylene glycol | 769 |
| Propylene glycol | 650 |
|  | 4049 |

The mixture was heated to 200° centigrade. The pressure was then reduced gradually to twenty millimeters of mercury and the reaction continued until an acid number of 1.4 was reached. The product was of a tar-like consistency and had a molecular weight of 1875.

883 parts of this polyester was mixed with 117 parts of tolylene diisocyanate mixed isomers (80/20;2,4/2,6). The NCO/OH mole ratio was 1.50. The mixture was heated at 120° centigrade for three hours. At the end of this time the free isocyanate content was 1.54%.

(b) *Chain extension.*—100 parts of the above polyester type isocyanate terminated prepolymer was dissolved in sixty parts of toluene. The solution was emulsified in a solution of six parts of a surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 100 parts of water. After one minute a solution of 2.16 parts of N-(2-hydroxypropyl)ethylene diamine in 25 parts of water was stirred in. A stable emulsion of polyurethane-urea polymer resulted which was coagulated by freezing and thawing. The polymer was washed, dried, and molded into sheets. The properties of this material are shown in Table 1.

EXAMPLE 6.—COMPARATIVE EXAMPLE (a) *Prepolymer formation* (see Example 5). (b) *Chain extension.*—100 parts of the polyester type isocyanate-terminated prepolymer described in Example 5 was mixed with sixty parts of toluene and 1.65 parts of 1,4-butanediol. The solution was poured into a tray and heated for eighteen hours at 70° centigrade and three hours at 120° centigrade. The resulting dry product was soft and sticky and of a tar-like consistency.

EXAMPLE 7.—POLYOXYETHYLENEPOLYOXYPROPYLENE GLYCOL (a) *Prepolymer formation.*—3360 parts of dihydric polyoxyethylenepolyoxypropylenes having a molecular weight of about 2,000, a polyoxyethylene content of about 15% by weight, and a molecular weight of the polyoxypropylene base of about 1,750, were mixed with 640 parts of mixed isomers of tolylene diisocyanate (80/20;2,4/2,6). The NCO/OH mole ratio was 2.16. The mixture was heated at 120° centigrade for three hours. At the end of this time the viscosity of the polyurethane prepolymer was 4600 centipoises at 25° centigrade and the free isocyanate content was 4.2%.

(b) *Chain extension.*—100 parts of this isocyanate-terminated prepolymer was dissolved in 100 parts of isopropyl acetate and the solution was emulsified in a solution of four parts of a surface active agent, consisting of dihydric polyoxyethylenepolyoxypropylenes having a molecular weight of about 6,760, a polyoxyethylene content of about 70% by weight, and a molecular weight of the polyoxypropylene base of about 2,050, in 200 parts of water. Within one minute a solution of 8.8 parts of N,N'-di(2-hydroxypropyl)ethylene diamine in 91.2 parts of water was stirred in. A stable emulsion of polyurethane-urea polymer resulted which was coagulated by freezing and thawing. The polymer was washed and dried. The product was a rubber that milled well on a cold mill, was soft and light colored.

EXAMPLE 8.—COMPARATIVE EXAMPLE (a) *Prepolymer formation.*—4800 parts of polyoxypropylene glycol of average molecular weight of about 400 was mixed with 3200 parts of mixed isomers (80/20;2,-4/2,6) of tolylene diisocyanate. The NCO/OH mole ratio was 1.60. The mixture was heated at 100–110° centigrade for three hours. At the end of this time the isocyanate content was 6.15%.

(b) *Chain extension.*—100 parts of this isocyanate-terminated prepolymer was mixed with 6.6 parts of 1,4-butanediol and sixty parts of toluene. The mixture was heated for eighteen hours at seventy degrees centigrade. After removing the toluene, a soft rubber was obtained, the properties of which are given in Table 1.

EXAMPLE 9.—COMPARATIVE EXAMPLE (a) *Prepolymer formation.*—4800 parts of polyoxypropylene glycol of average molecular weight 400 was mixed with 3200 parts of mixed isomers of tolylene diisocyanate (80/20;2,4/2,6) and the mixture was heated at 100 to 110° centigrade for three hours. The NCO/OH mole ratio was 1.6. At the end of this time, the free isocyanate content was 6.15%.

(b) *Chain extension.*—100 parts of this isocyanate-terminated semi-solid polyurethane prepolymer was dissolved in twenty parts of toluene and 35 parts of cyclohexanone. The solution was emulsified in a solution of 6.6 parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 110 parts of water using agitation at 15,000 r.p.m. Within one minute, a solution of 8.9 parts of 2,4-tolylene diamine in 25 parts of water were added and a stable emulsion of polyurethane-urea polymer resulted. The emulsion was coagulated by freezing and thawing. The polymer was separated, washed, dried, and molded into sheets. Characteristics of this polymer are shown in Table 1.

EXAMPLE 10.—COMPARATIVE EXAMPLE (a) *Prepolymer formation.*—3445 parts of dihydric polyoxyethylenepolyoxypropylenes having a molecular weight of about 2,000, a polyoxyethylene content of about 15% by weight, and a molecular weight of the polyoxypropylene base of about 1,750, was mixed with 555 parts of mixed isomers of tolylene diisocyanate (80/20;2,4/2,6) and the mixture heated at 120 centigrade for three hours. The NCO/OH mole ratio was 2.0. The viscosity was then 5000 centistokes at 25° centigrade and the free isocyanate content was 2.96%.

(b) *Chain extension.*—Forty parts of toluene was dissolved in 100 parts of this isocyanate-terminated liquid polyurethane prepolymer. The solution was emulsified in a solution of 10.2 parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 170 parts of water using agitation at 15,000 r.p.m. Within one minute, a solution of 4.3 parts of 2,4-tolylene diamine in 25.7 parts of isopropyl acetate was added to the emulsion and a stable emulsion of polyurethane-urea polymer was formed which was coagulated by freezing and thawing. The polymer was separated, washed, dried, and molded into sheets.

Characteristics of this product are shown in Table 1, which in general shows for the N-(2-hydroxypropyl) ethylene diamine extended polyurethanes of the present invention either superior processability at comparable tensile strength values or, at equal hardness values, a greater tensile strength.

EXAMPLE 11.—COMPARATIVE EXAMPLE—POLYOXYALKYLENE GLYCOL (a) *Prepolymer formation.*—2750 parts of polyoxypropylene glycol of average molecular weight 765 were mixed with 1250 parts of mixed isomers of tolylene diisocyanate (80/20;2,4/2,6) and the mixture was heated at 100° centigrade for three hours. The NCO/OH ratio was 2.0/1. At the end of this time, the viscosity at 25° centigrade was 37,000 centipoises and the isocyanate content was 7.12%.

(b) *Chain extension.*—100 parts of this isocyanate-terminated urethane propolymer were dissolved in twenty parts of toluene and 35 parts of cyclohexanone. The solution was emulsified in a solution of six parts of surface active agent, consisting of dihydric polyoxyethylene-polyoxypropylenes having a molecular weight of about 10,000, a polyoxyethylene content of about 80% by weight, and a molecular weight of the polyoxypropylene base of about 2,250, in 110 parts of water using agitation at 15,000 r.p.m. To the emulsion there was added within one minute's time a solution of 10.4 parts of 2,4-tolylenediamine in 25 parts of water. A urethane-urea polymer was formed which was washed, dried and molded into sheets. Some properties of this polyurethane-urea polymer are shown in Table II.

EXAMPLE 12.—POLYOXYALKYLENE GLYCOL (a) *Prepolymer formation* (see Example 11 for prepolymer formation). (b) *Chain extension.*—100 parts of the isocyanate-terminated urethane prepolymer prepared as in Example 11 was dissolved in forty parts of

*Table I.—Properties of Some Polyurethane-Urea Polymers*

| Example | 1(b) | 2 | 3 | 4(d) | 5 | 6(c) | 7 | 8(a)(c) | 9(e) | 10(f) |
|---|---|---|---|---|---|---|---|---|---|---|
| Diol | PPG-400 | L61 | (Example 2, vulcanized.) | (Example 2, vulcanized.) | PE | PE | L61 | PPG-400 | PPG-400 | L61. |
| NCO/OH mole ratio | 1.60 | 2.00 | | | 1.50 | 1.50 | 2.16 | 1.60 | 1.60 | 2.00. |
| Free NCO content of prepolymer, percent | 6.15 | 3.11 | | | 1.54 | 1.54 | 4.2 | 6.15 | 6.15 | 2.96. |
| Chain extending agent | HPED | HPED | HPED | TDA | HPED | 1,4-butane diol. | DHPED | 1,4-butane diol. | TDA | TDA. |
| Shore A Hardness, 5" | 98 | 32 | | | 45 | Tar. | Soft millable rubber. | 22 | 99 | 65. |
| Shore D Hardness, 5" | 60 | | | | | | | | 75 | |
| Tensile strength, p.s.i | 4,700 | 670 | 3,770 | 2,845 | 950 | | | 250 | 5,000 | 850. |
| Elongation at break, percent | 290 | 1,900 | 1,180 | | 840 | | | 1,900 | 85 | 1,160. |
| Stress at 300 percent Elongation, p.s.i | | 50 | 1,010 | | Low | | | 140 | | 505. |
| Yield point, p.s.i | 2,430 | | | | | | | | 7,730 | |

PPG-400 = Polyoxypropylene glycol, M.W. ca. 400.
L61 = Polyoxyethylenepolyoxypropylene glycol, M.W. 2000; polyoxyethylene content 15%.
PE = Propylene glycol-ethylene glycol adipate, M.W. 1875.
HPED = N-(2-hydroxypropyl)ethylene diamine.
DHPED = N,N'-di(2-hydroxylpropyl)ethylene diamine.
TDA = Tolylene diamine.

(a) = Comparison with Example 1.
(b) = Plastic-note yield point.
(c) = Straight polyurethane polymer.
(d) = Comparison with Example 3.
(e) = Comparison with Examples 1 and 8.
(f) = Comparison with Example 2.

toluene. To this solution there was added with agitation at 15,000 r.p.m. a solution of six parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 100 parts of water. An inversion of phase occurred and an emulsion of prepolymer solution in water was formed. To the emulsion, within one minute after its preparation, a solution of ten parts of N-(2-hydroxypropyl)ethylene diamine was added. An emulsion of urethane-urea polymer was formed which was coagulated by freezing and thawing. The polymer was separated, washed, dried and molded into sheets.

Some properties of this polyurethane-urea polymer are shown in Table II, which shows in general for the N-(2-hydroxypropyl)ethylene diamine extended polyurethanes of the present invention either better processibility at tensile strength values comparable to those of tolylene diamine-extended polyurethanes or, at equal hardness values, a greater tensile strength for the products of the present invention.

*Table II.—Comparison of Urethane-Urea Polymers Prepared From TDA and HPED*

| | (1) | (2) | (3) | (4) |
|---|---|---|---|---|
| Glycol | L61 | PPG 765 | PPG 765 | PPG 400 |
| NCO/OH ratio | 2.00 | 2.00 | 1.75 | 1.60 |
| EXTENDING AGENT | | | | |
| TDA: | | | | |
| Shore A Hardness, 5″ | 65 | 91 | 86 | 99 |
| Shore D Harness, 5″ | | | | 75 |
| Tensile strength, p.s.i | 850 | 3,670 | 4,290 | 5,000 |
| Elongation at break, percent | 1,160 | 370 | 735 | 85 |
| Stress at 300% elong., p.s.i | 505 | 3,100 | 1,930 | |
| Yield point, p.s.i | | | | 7,730 |
| HPED: | | | | |
| Shore A Hardness, 5″ | 32 | 76 | 60 | 98 |
| Shore D Harndess, 5″ | | | | 60 |
| Tensile strength, p.s.i | 670 | 6,420 | 3,960 | 4,700 |
| Elongation at break, percent | 1,900 | 970 | 1,130 | 290 |
| Stress at 300% elong., p.s.i | 50 | 960 | 340 | |
| Yield point, p.s.i | | | | 2,430 |

TDA=Tolylene diamine.
HPED=N-(2-hydroxypropyl)ethylene diamine.
L61=Polyoxyethylenepolyoxypropylene glycol, M.W./2000; polyoxyethylene content 15%.
PPG 400=Polyoxypropylene glycol, M.W. 400.
PPG 765=Polyoxypropylene glycol, M.W. 765.
(1) Example 10 vs. Example 2.
(2) Example 11 vs. Example 12.
(3) Two new examples.
(4) Example 9 vs. Example 1.
The above data are on raw, unfilled, unvulcanized stocks pulled at a jaw speed of twenty inches per minute, except for the polymers prepared from PPG 400 which were pulled at a jaw speed of one inch per minute.

CURING AND COMPOUNDING

The polyurethane-urea polymers may if desired be cured in the following manner, for example, by milling into the polymer an organic polyisocyanate such as mentioned previously, or e.g., 2,4-tolylene diisocyanate dimer or N,N'-bis(3-isocyanato-4-methylphenyl)urea, in a ratio of from two to eight parts per 100 parts of polymer while it is being worked on a rubber mill at temperatures of less than 100° centigrade, and then curing the mixture by molding and heating to from 100° to 150° centigrade, or even less, for from fifteen to sixty minutes.

Vulcanizing agents other than polyisocyanates may be employed. For instance, tetrachlorquinone, quinone dioxime, paraformaldehyde, organic and inorganic peroxides, and low-stage phenolic, melamine, or urea-formaldehyde resins may also be used to vulcanize these polymers.

Other methods of effecting a cure are available and will be apparent to one skilled in the art.

The preferred amount of diisocyanate curing agent used will depend somewhat on the nature and previous history of uncured elastomer which is to be treated. It is desirable that not substantially more than 0.5 to 2% by weight of arylene diisocyanate having only one unshielded isocyanate group, such as 2,4-tolylene diisocyanate, be used. The amount of diisocyanate having both isocyanate groups shielded, such as N,N'-bis(3-isocyanato-4-methylphenyl)urea, used is somewhat less critical and may vary from 1 to 20%, although from 1 to 8% is ordinarily sufficient. In general the rate of cure increases with higher amounts of diisocyanate curing agent.

In carrying out curing procedure, the uncured elastomeric reaction product may be mechanically worked on a rubber mill or other mixing equipment until it forms a smooth sheet. Compounding agents, such as carbon black, plasticizers, and the like are added as desired. The polyisocyanate is added while milling is continued. The compounded mass is sheeted off the mill and cures, ordinarily by heating. Temperatures of 90 to 150° centigrade, or even less, are normally used and only enough pressure is required to force the compounded elastomer into the mold. This may range from thirty to forty pounds up to 3000 pounds per square inch. At the temperatures mentioned, fifteen to forty-five minutes are usually sufficient to produce a cure. Curing may be effected without the application of pressure. The compounded elastomer may be sheeted out and calendered either alone or onto a substrate such as a plastic or textile and may then be heated to produce the cure. It is also possible to cure the product without using either pressure or elevated temperature, but this ordinarily requires substantially longer times.

Thin films of the dried polymer may be treated with organic diisocyanates, either by dipping into a liquid diisocyanate or a solution thereof or by exposure to the vapors of a diisocyanate, and then cured by heating. It appears that the diisocyanate can penetrate into the films sufficiently rapidly to permit curing of the film. Alternatively, a curing agent may be dispersed in the latex so that when a film is formed the curing agent is homogeneously distributed in the coagulated film and it is only necessary to dry and heat to cure the film. Obviously, such curing agents must be stable under the conditions existing in the latex. Products having blocked or hindered —NCO groups which are liberated or become active when heated are suitable for this use.

The elastomers prepared according to the present invention may be used for the same purposes as other elastomers. They may be molded and shaped and from them may be prepared such articles as tires, inner tubes, belts, hose and tubes, wire and cable jackets, footwear, sponge, coated fabric and various other molded or dipped articles. They may be processed to give thermoplastic or thermosetting coatings, molded articles, or films.

The basic elastomeric properties of these products may be varied, if desired, by suitable compounding. The type and amount of the compounding agent to be used is dependent upon the use for which the elastomer is intended. Some of the more important compounding agents which are of value with these elastomers, especially those based on polyether glycols, are carbon black, clay, silica, talc, zinc and magnesium oxides, titanium dioxide and tetraalkoxides, and plasticizers. Inorganic and organic coloring agents may be incorporated to give well-defined colored products. The natural color of the elastomers is a water white to a pale yellow.

The compounding agents may be mixed or incorporated with the product at the same time that polyisocyanate vulcanizing agents are added, if desired. Conventional rubber processing machinery such as rubber mills and Werner-Pfleiderer or Banbury mixers may be used. The resulting compounded stocks may be shaped or cured in conventional rubber industry equipment. Alternatively the stocks may be dissolved or extended with solvents for application to surfaces upon which they may be cured after evaporation of the solvent.

I claim:

1. A process for the production of a novel high molecular weight polyurethane-urea polymer, characterized by an improved tensile strength to hardness ratio, and which contains urea-linked N-(2-hydroxypropyl)alkylene diamine radicals, one of the nitrogen atoms of each urea bridge being provided by the said diamine, which consists in mixing and reacting together (I) an isocyanate-terminated polyurethane polymer formed from (a) a polymeric glycol having a molecular weight of at least 250, and being selected from the group consisting of polyalkylene ether glycols and polyester glycols, and (b) an organic polyisocyanate, and about 0.5 to 1.5 amine equivalents of (II) per equivalent of (I), (II) being an N-(2-hydroxypropyl)alkylene diamine, to produce an N-(2-hydroxypropyl)alkylene diamine containing polyurethane-urea polymer characterized by the presence of recurring structural urea linkages of the general formula:

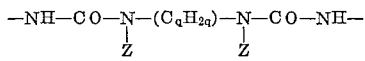

wherein Z is selected from the group consisting of —CH$_2$CHOHCH$_3$ and hydrogen, at least one Z in each such linkage being —CH$_2$CHOHCH$_3$, and wherein $q$ is an integer from 2 to 10, inclusive, the relationship of (I) and (II) being such that said recurring structural urea linkages of the above-given formula recur on an average of at least once for every 8,000 molecular weight units of said polyurethane-urea polymer.

2. A process for the production of a novel high molecular weight polyurethane-urea polymer, characterized by an improved tensile strength to hardness ratio, and which contains urea-linked N-(2-hydroxypropyl) alkylene diamine radicals, one of the nitrogen atoms of each urea bridge being provided by the said diamine, which consists in mixing and reacting together (I) an isocyanate-terminated polyurethane polymer formed from (a) a polyalkylene ether glycol having a molecular weight of at least 250, and (b) an organic diisocyanate, and about 0.5 to 1.5 amine equivalents of (II) per equivalent of (I), (II) being an N-(2-hydroxypropyl)alkylene diamine, to produce an N-(2-hydroxypropyl)alkylene diamine containing polyurethaneurea polymer characterized by the presence of recurring structural urea linkages of the general formula:

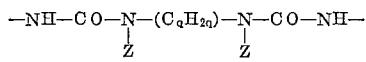

wherein Z is selected from the group consisting of —CH$_2$CHOHCH$_3$ and hydrogen, at least one Z in each such linkage being —CH$_2$CHOHCH$_3$, and wherein $q$ is an integer from 2 to 10, inclusive, the relationship of (I) and (II) being such that said recurring structural urea linkages of the above-given formula recur on an average of at least once for every 8,000 molecular weight units of said polyurethane-urea polymer.

3. A process for the production of novel polyurethane-ureas according to claim 2, wherein the N-(2-hydroxypropyl)alkylene diamine (II) is N,N'-di(2-hydroxypropyl)alkylene diamine.

4. A process for the production of novel polyurethane-ureas according to claim 2, wherein the N-(2-hydroxypropyl)alkylene diamine (II) is N,N'-di(2-hydroxypropyl)alkylene diamine and wherein the polyalkylene ether glycol (a) is polyethylene ether polypropylene ether glycol.

5. A process for the production of novel polyurethane-ureas according to claim 2, wherein the N-(2-hydroxypropyl)alkylene diamine (II) is N,N'-di(2-hydroxypropyl)ethylene diamine and wherein the polyalkylene ether glycol (a) is polyethylene ether polypropylene ether glycol, and wherein the organic diisocyanate (b) is tolylene diisocyanate.

6. A process for the production of novel polyurethane-ureas according to claim 2, wherein the N-(2-hydroxypropyl)alkylene diamine (II) is an N-mono-(2-hydroxypropyl)alkylene diamine.

7. A process for the production of novel polyurethane-ureas according to claim 2, wherein the N-(2-hydroxypropyl)alkylene diamine (II) is an N-mono-(2-hydroxypropyl)alkylene diamine and wherein the polyalkylene ether glycol (a) is polyethylene ether polypropylene ether glycol.

8. A process for the production of novel polyurethane-ureas according to claim 2, wherein the N-(2-hydroxypropyl)alkylene diamine (II) is N-(2-hydroxypropyl)ethylene diamine, wherein the polyalkylene ether glycol (a) is polyethylene ether polypropylene ether glycol, and wherein the organic diisocyanate (b) is tolylene diisocyanate.

9. A process for the production of novel polyurethane-ureas according to claim 2, wherein the N-(2-hydroxypropyl)alkylene diamine (II) is an N-mono-(2-hydroxypropyl)alkylene diamine and wherein the polyalkylene ether glycol (a) is polypropylene ether glycol.

10. A process for the production of novel polyurethane-ureas according to claim 2, wherein the N-(2-hydroxypropyl)alkylene diamine (II) is N-(2-hydroxypropyl)ethylene diamine, wherein the polyalkylene ether glycol (a) is polypropylene ether glycol, and wherein the organic diisocyanate (b) is tolylene diisocyanate.

11. A process for the production of novel polyurethane-ureas according to claim 2, wherein the molar ratio of N-(2-hydroxypropyl)alkylene diamine (II) to isocyanate-terminated polyurethane polymer (I) is about 1:1.

12. A process for the production of novel polyurethane-urea product containing pendant 2-hydroxypropyl groups is subsequently reacted with an organic polyisocyanate to effect a cure through cross-linking thereof.

13. A process for the production of novel polyurethane-ureas according to claim 2, wherein the polymeric polyurethane-urea product containing pendant 2-hydroxypropyl groups is subsequently reacted with an organic polyisocyanate to effect a cure through cross-linking thereof.

14. A novel N-(2-hydroxypropyl)alkylene diamine chain-extended polyurethane polymer produced in accord with the process of claim 1.

15. A novel N-(2-hydroxypropyl)alkylene diamine chain-extended polyurethane polymer produced in accord with the process of claim 2.

16. A polyurethane-urea produced according to the process of claim 2, wherein the N-(2-hydroxypropyl)alkylene diamine (II) is N,N'-di(2-hydroxypropyl)alkylene diamine.

17. A polyurethane-urea produced according to the process of claim 2, wherein the N-(2-hydroxypropyl)alkylene diamine (II) is N,N'-di(2-hydroxypropyl)ethylene diamine and wherein the polyalkylene ether glycol (a) is polyethylene ether polypropylene ether glycol.

18. A polyurethane-urea produced according to the process of claim 2, wherein the N-(2-hydroxypropyl)alkylene diamine (II) is N,N'-di(2-hydroxypropyl)ethylene diamine, wherein the polyalkylene ether glycol (a) is polyethylene ether polypropylene ether glycol, and wherein the organic diisocyanate (b) is tolylene diisocyanate.

19. A polyurethane-urea produced according to the process of claim 2, wherein the N-(2-hydroxypropyl)alkylene diamine (II) is an N-mono-(2-hydroxypropyl)alkylene diamine.

20. A polyurethane-urea produced according to the process of claim 2, wherein the N-(2-hydroxypropyl)-alkylene diamine (II) is an N-mono-(2-hydroxypropyl)-alkylene diamine and wherein the polyalkylene ether glycol (a) is polyethylene ether polypropylene ether glycol.

21. A polyurethane-urea produced according to the process of claim 2, wherein the N-(2-hydroxypropyl)-alkylene diamine (II) is N-(2-hydroxypropyl)ethylene diamine, wherein the polyalkylene ether glycol (a) is polyethylene ether polypropylene ether glycol, and wherein the organic diisocyanate (b) is tolylene diisocyanate.

22. A polyurethane-urea produced according to the process of claim 2, wherein the N-(2-hydroxypropyl)-alkylene diamine (II) is an N-mono-(2-hydroxypropyl)-alkylene diamine and wherein the polyalkylene ether glycol (a) is polypropylene ether glycol.

23. A polyurethane-urea produced according to the process of claim 2, wherein the N-(2-hydroxypropyl)-alkylene diamine (II) is N-(2-hydroxypropyl)ethylene diamine, wherein the polyalkylene ether glycol (a) is polypropylene ether glycol, and wherein the organic diisocyanate (b) is tolylene diisocyanate.

24. A cured polyurethane-urea obtained by reacting a polyurethane-urea produced according to the process of claim 1 with an organic polyisocyanate.

25. A cured polyurethane-urea obtained by reacting a polyurethane-urea produced according to the process of claim 2 with an organic polyisocyanate.

26. A novel N-(2-hydroxypropyl)alkylene diamine chain-extended polyurethane polymer produced in accord with the process of claim 11.

References Cited in the file of this patent

UNITED STATES PATENTS

| | | |
|---|---|---|
| 2,621,166 | Schmidt et al. | Dec. 9, 1952 |
| 2,663,729 | Searle et al. | Dec. 22, 1953 |
| 2,843,569 | Benning et al. | July 15, 1958 |
| 2,927,098 | Goldberg | Mar. 1, 1960 |
| 2,929,800 | Hill | Mar. 22, 1960 |
| 2,929,803 | Frazer et al. | Mar. 22, 1960 |
| 2,953,489 | Young | Sept. 20, 1960 |

OTHER REFERENCES

Saunders et al.: Chemical Reviews, 43, 1948, pages 203–218, page 210 specially relied on.

UNITED STATES PATENT OFFICE
CERTIFICATE OF CORRECTION

Patent No. 3,148,173                            September 8, 1964

Seymour L. Axelrood

It is hereby certified that error appears in the above numbered patent requiring correction and that the said Letters Patent should read as corrected below.

Column 2, line 33, for "to", second occurrence, read -- of --; column 5, line 38, for "hydroxy" read -- hydroxyl --; column 6, line 30, for "xylene" read -- xylylene --; column 10, line 16, after "then" insert -- be --; column 14, line 33, for "propolymer" read -- prepolymer --.

Signed and sealed this 6th day of July 1965.

(SEAL)
Attest:

ERNEST W. SWIDER                            EDWARD J. BRENNER
Attesting Officer                                Commissioner of Patents